United States Patent Office 3,561,923
Patented Feb. 9, 1971

3,561,923
PROCESS FOR THE PRODUCTION OF CHLORINE
Isamu Takakura, Chiba, Shinzaburo Maeda, Tokyo, Tadashi Namba and Yasuo Niwa, Chiba, Tetsuya Uchino and Kimihiko Sato, Yokohama, and Nobuaki Kunii, Tokyo, Japan, assignors to Asahi Glass Co., Ltd., Tokyo, Japan
No Drawing. Filed Mar. 25, 1968, Ser. No. 715,582
Claims priority, application Japan, Mar. 29, 1967, 42/19,198; Sept. 4, 1967, 42/56,435; Feb. 14, 1968, 43/8,855
Int. Cl. C01b 7/02
U.S. Cl. 23—219      4 Claims

ABSTRACT OF THE DISCLOSURE

A reaction mass is produced by impregnating a porous inert support with magnesium chloride and alkali metal chloride as well as copper chloride as reaction promoter, said reaction mass is chlorinated by means of hydrogen chloride or ammonium chloride, and then the resulting chlorinated mass is oxidized by oxygen or air to generate chlorine, while at the same time the reaction mass regenerated by the oxidation is recycled to said chlorination stage.

BACKGROUND OF THE INVENTION

(1) Field of the invention

This invention relates to a process for the production of chlorine. More particularly, the invention relates to a process for the production of chlorine from hydrogen chloride or ammonium chloride with a high yield and high concentration.

(2) Description of the prior art

Processes for the production of chlorine have hitherto been known in which hydrogen chloride or ammonium chloride is caused to react with oxide of metal, such as iron, manganese, magnesium or the like to produce metal chloride (hereinafter shortly referred to as chlorination) and the resulting metal chloride is caused to react with oxygen to produce chlorine and simultaneously restore to the original metal oxide (hereinafter shortly referred to as oxidation).

In the case iron or manganese oxide, particularly iron oxide is adopted as metal oxide, occurrence of various obstacles have been recognized.

The reason therefor is in that, since vapor pressure of iron chloride produced by chlorination is high, the iron chloride is remarkably gasified and lost while it is used repeatedly.

On the other hand, in the case magnesium oxide is used as metal oxide, the above-mentioned disadvantage can be avoided. However, in order to produce only magnesium chloride, and simultaneously maintain the conversion of hydrogen chloride or ammonium chloride as high as possible without forming basic magnesium chloride which is the cause of hydrogen chloride being incorporated into chlorine formed in the oxidation step, the following process should be followed. For instance, according to U.S. Pat. No. 3,323,871, hydrogen chloride gas or ammonium chloride gas should be brought into contact with each other in such a manner that magnesium oxide having high concentration of chloride and high reaction temperature may be shifted to magnesium oxide having low concentration of chloride and low reaction temperature.

Accordingly, appropriate temperature differences should be imparted to a reactor or reaction vessel in which chlorination is carried out. To this end, it is also known that a complicated temperature control operation is required.

BRIEF SUMMARY OF THE INVENTION

The object of the present invention is to provide a process for the production of chlorine wherein hydrogen chloride or ammonium chloride is converted to chloride with using magnesium oxide at high efficiency without necessitating above-described complicated temperature control, and from which chloride chlorine is produced.

Another object of the present invention is to provide a process for the production of chlorine wherein chlorine is produced at a high yield from hydrogen chloride or ammonium chloride.

Still another object of the present invention is to provide an optimum reaction mass for carrying out such processes.

Other objects of the present invention will be apparent from the following description of the invention.

DETAILED DESCRIPTION INCLUDING PREFERRED EMBODIMENTS

According to the present invention, it has been found that when magnesium oxide and alkali metal chloride are supported on porous inert support, magnesium chloride obtained in chlorination process forms directly a fused state, and the formation of magnesium oxide, which is a reverse reaction, is substantially suppressed, and magnesium chloride can be formed easily without imparting a temperature difference in the reaction vessel as in conventional known methods and without lapsing the formation of basic magnesium chloride.

As a result, it has been found that when magnesium oxide is brought into contact with hydrogen chloride gas or ammonium chloride gas, said chloride gas is converted in magnesium chloride at high conversion rate.

Furthermore, it has been found that, according to the present invention, the formation of magnesium chloride by the process described above and the oxidation of magnesium chloride can be effected at an industrially satisfactory conversion rate by coexistence of at least one chloride selected from the group consisting of copper chloride, cadmium chloride and nickel chloride.

Reaction in each step wherein a reaction mass composed of magnesium oxide, alkali metal chloride and at least one chloride selected from the group consisting of copper chloride, cadmium chloride and nickel chloride are used in accordance with the present invention is shown respectively by following formula:

Chlorination step—

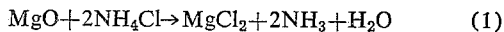
$$MgO + 2NH_4Cl \rightarrow MgCl_2 + 2NH_3 + H_2O \qquad (1)$$

Oxidation step—

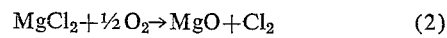
$$MgCl_2 + \tfrac{1}{2} O_2 \rightarrow MgO + Cl_2 \qquad (2)$$

It has been found that at a reaction temperature above 470° C., magnesium chloride fuses with alkali metal chloride and molten salt is formed in the reaction mass and when the chlorination temperatures of 500° to 650° C. are adopted, hydrogen chloride or ammonium chloride is caused to react with magnesium oxide at satisfactory conversion rate to produce magnesium chloride and further, in the oxidation reaction, the reaction mass causes to proceed the reaction shown in Formula 2 at a reaction temperature above 520° C., and a high concentration chlorine gas is obtained. On the other hand, at reaction temperatures below 500° C., the reaction velocity is lowered, and since at the reaction temperature above 650° C., conversion of hydrogen chloride or ammonium chloride into magnesium chloride is lowered, such a temperature is not favorable. In each process of chlorination step and oxidation step, both cadmium and nickel take part in the reaction as chloride; and copper participates as CuCl or CuCl₂ in the chlorination step; and in oxidation step, it participates in the reaction in the form of $CuCl_2$ or partially oxidized form like $CuO \cdot CuCl_2$, and therefore these compounds are considered to be useful as promoter for reaction (hereinafter shortly called reaction promoter component).

Porous inert support makes on one hand the reaction mass easy to handle while carrying out the reaction in the state of fused salt phase and makes, on the other hand, the contact between reaction mass and reaction gas good and favorable. The desirable proportions of each component contained in reaction mass are in that mole ratio of alkali metal chloride to magnesium oxide (MCl/MgO) is 0.3–1.5 and atomic ratio of reaction promoter component to magnesium (Cu, Cd, Ni/Mg) is 0.05–0.5.

When mole ratio of MCl/MgO is selected above 1.5, the chlorination reaction becomes somewhat advantageous, but oxidation reaction is remarkably impaired. Further, when the atomic ratio of reaction promoter component to magnesium is below 0.05, promotion effect of reaction is low, whereas when the atomic ratio is above 0.5, the amount of gasification loss of chloride will increase in the case of cadmium and nickel. Particularly, in the case of copper, not only the amount of gasification loss increases, but also oxidation reaction is promoted, but the progress of chlorination reaction is impaired, and it becomes the cause of decreasing percentage of chlorination of reaction mass.

Such compositions are generally used with impregnation in a porous inert support. As the form of compound used at this time, there may be used in addition to chloride, compounds, which can be converted to chloride or oxide in the reaction state, for instance, oxide, hydroxide, carbonate, sulfate and nitrate.

Porous inert support used when the present invention process is practiced, is not particularly limited. For instance, commonly known pumice stone, diatomaceous earth, aluminous support and silicon carbide support can be used appropriately.

Further, magnesium oxide, alkali metal chloride and reaction promoter component can be supported with impregnation in a porous inert support formed into granules of predetermined size, or it is also possible to form into granules of predetermined size after each of the above-mentioned components has been mixed with the porous inert support. The amount of each above-mentioned component to be supported on the porous inert support differs somewhat, depending on the kind of porous inert support used. However, it is considered appropriate to select the amount of each component in the order from 10 to 100 parts by weight for 100 parts by weight of porous inert support.

Further, the size of reaction mass can be selected appropriately in accordance with the reaction system of fluidized bed, moving bed or the like.

However, if the following process is adopted in the moving bed, a good result is obtained. To begin with, in the first step, hydrogen chloride gas or ammonium chloride gas gasified by an appropriate means, and carried by nitrogen gas or carbonic acid gas and other inert gas, as required, is brought into contact with reaction mass in a counter current at a temperature of 500 to 650° C. whereby reaction is effected. The hydrogen chloride or ammonium chloride in gaseous state is usually introduced into the chlorination chamber from below, while the reaction mass is introduced into said chamber and allowed to flow down by gravity, during which time 10 to 80% of the total weight of magnesium oxide is subjected to chlorination, and then transferred to the second step. In the second step, the reaction mass chlorinated in the first step is allowed to flow down through the oxidation from above to below by gravity. On the other hand, oxygen or air is fed into said chamber from below. Said reaction mass is brought into contact with oxygen or air in a counter current at a reaction temperature of 520 to 650° C. and put into oxidation to liberate chlorine. The chlorine produced is recovered from the top of the reaction chamber and the oxidized reaction mass is recycled to said first step and used repeatedly.

The detailed studies on the step for the production of chlorine has clarified the following facts. In the reaction mass added with copper salt as a promoter, if copper is present in divalent state in the chlorination process, oxygen will be generated according to the reaction of Equation 3 mentioned below. The generated oxygen oxidizes hydrogen chloride to generate chlorine. As chlorine produced in this case is not fixed in the reaction mass, conversion of hydrogen chloride is lowered in the chlorination process.

$$MgO + 2Cu^{++} \rightarrow Mg^{++} + 2Cu^{+} + \tfrac{1}{2}O_2 \qquad (3)$$

In the case where ammonium chloride is used as a chlorinating agent, it has been found that dissociated ammonia will be burnt with oxygen generated by Equation 3 and ammonia will be lost.

The present inventors have executed numerous experiments and laborious studies, with the object of the production of high concentration chlorine and with high yield from hydrogen chloride or ammonium chloride, without entailing the above stated disadvantages and thus found that said objects can be accomplished by adopting a process comprising the following steps:

(a) The first step of reducing copper contained in the reaction mass to a monovalent or metal state by means of reducing gas, such as hydrogen, carbon monoxide, water gas or coal gas;

(b) The second step of chlorinating the reaction mass having passed said first step, by means of hydrogen chloride gas or ammonium chloride gas;

(c) The third step of generating chlorine by oxidizing the reaction mass having passed said second step, by means of oxygen or air; and (d) The step of recycling the reaction mass having been restored to the original by passing through said third step to the aforesaid first step.

In the present invention, means for reducing copper contained in the reaction mass lies in that the reduction of said reaction to a monovalent or metal state is conducted by using a reducing gas, such as hydrogen, carbon monoxide, water gas or coal gas, wherein the reaction in this case is represented by $$CuO \cdot CuCl_2 + H_2 \rightarrow 2CuCl + H_2O$$

Generally, copper oxide or copper chloride is respectively easily reduced to metallic copper by excess hydrogen gas at above 350° C.

When the said copper salt is reduced to metallic copper in the reduction step, the following reaction will occur in the chlorination step to generate hydrogen gas.

$$Cu + NH_4Cl \rightarrow CuCl + NH_3 + \tfrac{1}{2}H_2$$

$$Cu + HCl \rightarrow CuCl + \tfrac{1}{2}H_2$$

The generated hydrogen gas is diluted by inert gas introduced in chlorination step, and the concentration is remarkably lowered.

Therefore, it is substantially impossible to recover the generated hydrogen gas and reuse it. As a result, reduction to metallic copper will result in excess reduction and since it only increases consumption or reducing gas, it is desirable to control the reduction operation such in the reduction step, so that divalent copper may be reduced partially, especially to monovalent copper.

In the reduction step of the present invention, it becomes possible to control excess reduction of copper salts by using 0.5 mole to 0.7 mole of reducing gas such as hydrogen, carbon monoxide, water gas or coal gas or the like per 1 gram atom of copper. Further, if the temperature of the reduction step is generally above 350° C., the reaction of reduction and its velocity can fully be made industrially sufficient. However, in the present invention it is appropriate to choose as 500 to 650° C. from the point of heat balance of the whole process.

The reduced reaction mass is chlorinated by hydrogen or ammonium chloride at 500 to 650° C. Furthermore, according to the present inventors' studies, it has been found that chlorination and reduction can be simultaneously carried out, and if said process is adopted, one reaction zone can be decreased, and as a result, the apparatus can be made compact correspondingly. If the chlorination temperature is made below 500° C., there is a fear that the magnesium salt in the reaction mass will produce basic magnesium chloride.

On the other hand, if temperatures above 650° C. are adopted, conversion of hydrogen chloride or ammonium chloride is lowered and is inappropriate respectively.

Chlorinated reaction mass is oxidized by oxygen or air to generate chlorine.

Furthermore, according to the present inventors' studies, in the case where the chlorinated reaction mass is oxidized as described above, there occur two different types of reaction as shown in the following. As a result of studies on both reaction velocities, it has been found that the reaction velocity of Equation 5 is far higher than that of Equation 4.

$$MgCl_2 + \tfrac{1}{2} O_2 \rightarrow MgO + Cl_2 \quad (4)$$

$$2CuCl + \tfrac{1}{2} O \rightarrow CuO \cdot CuCl_2 \quad (5)$$

When the chlorinated reaction mass is oxidized, by using air, oxygen contained in the air is first used for oxidation of copper salt in accordance with Equation 5 and subsequently consumed for generation of chlorine in accordance with Equation 4. As a result, it has been found that if chlorine is generated according to Equation 4 followed by the Equation 5, it follows that the nitrogen gas in the air is introduced during the oxidation step represented by Equation 4, and chlorine gas generated is diluted with said nitrogen gas.

In the present invention, as shown in Equation 5, oxidation is first effected (hereinafter called preoxidation) by using oxygen gas or air in a quantity necessary for oxidizing monovalent copper to divalent copper, and it has been found that a decrease in the concentration of chlorine gas generated from reaction mass by carrying out oxidation reaction shown by Equation 4 can be suppressed.

The amount of oxygen contained in oxygen gas or air which is introduced into the pre-oxidation step in order to effect said pre-oxidation in the present invention is sufficient to be an amount necessary for oxidizing monovalent copper contained in the reaction mass to divalent copper. It is appropriate to set usually:

the amount of oxygen contained in oxygen gas or air/ the amount necessary for oxidize cuprous chloride to cupric chloride=0.9 to 1.1.

After further experiments and studies, the present inventors have found that the oxidation of copper salts in the pre-oxidation may be effected by using oxygen gas or air as described above and, however, in addition thereto, such oxidation can also be effected by using chlorine under the same reaction conditions as those. The pre-oxidation by using chlorine as well as the reaction of copper in the oxidation, which is subsequently effected for the generation of chlorine gas, are shown respectively by the following Equations 6 and 7.

$$2\ CuCl + Cl_2 \rightarrow 2\ CuCl_2 \quad (6)$$

$$2\ CuCl_2 + \tfrac{1}{2}\ O_2 \rightarrow CuO \cdot CuCl_2 + Cl_2 \quad (7)$$

Thus, reaction mass in pre-oxidation effected by using chlorine according to Equation 6 will be oxidized according to Equation 7, thereby chlorine gas is produced from cupric chloride.

The amount of chlorine consumed in the pre-oxidation shown by Equation 6 in equivalent to that of the chlorine produced in the oxidation step shown in Equation 7.

The pre-oxidation of reaction mass carried out on an industrial scale is preferable to be carried out in such a manner that chlorine is generated by using air in the oxidation step and the chlorine thus obtained is returned to the pre-oxidation step in an amount which is required for converting cuprous chloride into cupric chloride.

When the pre-oxidation is carried out or practiced with chlorine in this way, there is no need of particular introduction of oxygen or air into the pre-oxidation step, and as a result thereof the apparatus is simplified.

Moreover, the reaction temperature above 500° C., may be adopted in pre-oxidation but it is appropriate to choose 500 to 650° C. from a point of heat balance of the whole process.

The reaction mass thus pre-oxidized is oxidized by air at a reaction temperature of from 520 to 650° C. to produce chlorine. The oxidized reaction mass is again recycled to the reduction step for repeated use.

The present invention is further described in the following examples, which are illustrative but not limitative thereof.

EXAMPLE 1

143 gm. of anhydrous magnesium chloride ($MgCl_2$), 41 gm. of cupric chloride ($CuCl_2 \cdot 2H_2O$) and 56.1 gm. of potassium chloride (KCl) were completely dissolved in 200 cc. of water to obtain an aqueous solution. 300 gm. of commercial alumina carriers sized in balls of 3 mm. diameter were put in the aqueous solution, and heated to boiling state and then allowed to stand for about 1 hour, thereby carriers are impregnated with said solution. The resulting reaction mass was taken out from the solution and dried for about 3 hours at 110° C. Then, chlorination of the reaction mass was effected for about 1 hour by using mixed gas (partial pressure of hydrogen chloride was 0.4 atm.) of hydrogen chloride and nitrogen at 600° C. in a tube reactor, and then oxidation is performed at 600° C. by using air for 1 hour. The impregnation, chlorination and oxidation were repeated again.

The weight of effective component contained in the reaction mass thus obtained was 23% of the total weight of reaction mass.

The reaction mass chlorinated was introduced from above into a furnace comprising a moving bed having inner diameter of 3 cm. and height of 60 cm. (the retaining amount of reaction mass was 540 gm.). Then, the reaction mass was made to flow down by gravity at a velocity of 540 gm./hour and brought into contact with a mixed gas of nitrogen gas 325 cc./min. with hydrogen chloride gas 215 cc./min., which was blown into from below in a counter current at the reaction temperature of 600° C. and subjected to chlorination.

In analysis of the generated gas from the upper portion of the furnace, nitrogen and chlorine formed from the oxidation of unreacted hydrogen chloride and hydrogen chloride were detected. 90.1% of hydrogen chloride introduced into the chlorination furnace was caused to react with the reaction mass and fixed. The hydrogen chloride which is converted into chlorine by being oxidized was 7.3% of introduced hydrogen chloride and the remaining 2.6% of hydrogen chloride was recovered as unreacted amount.

The reaction mass chlorinated was introduced from above into a similar furnace as used for said chlorination, and the reaction mass is allowed to flow down by gravity at a velocity of 540 gm./hour and was brought into contact with 360 cc./min. of demoistured air blown into the furnace from below at the reaction temperature of 600° C., in counter current to effect oxidation.

Mixed gas containing chlorine of 18 volume percent and hydrogen chloride of 3 volume percent was obtained from the top of the furnace.

EXAMPLE 2

238 gm. of anhydrous magnesium chloride ($MgCl_2$), 93 gm. of potassium chloride and 218 gm. of nickel chloride ($NiCl_2 \cdot 6H_2O$) were melted at 600° C.

Then, 100 gm. of Celite 408 (trade name for diatomaceous earth carrier sold by Johns Manville Sales Corporation) of circular cylinder having 3 mm. diameter and 5 mm. length was placed in the aforesaid fused salts prepared and immersed for 1 hour and took out, and thereafter chlorinated for 1 hour at the reaction temperature of 600° C. with a mixed gas of hydrogen chloride with nitrogen (the partial pressure of hydrogen chloride was 0.4 atm.), and then pretreated by oxidation with air for 3 hours to produce a reaction mass. The weight of effective components contained in the reaction mass after the pretreatment was 49% of total weight of reaction mass.

The resulting reaction mass was introduced from above into a furnace (the retaining amounts of reaction mass was 5.2 kg.) having inner diameter of 10 cm. and height of 80 cm. The reaction mass was allowed to flow down by gravity at a velocity of 4.5 kg./hour and was brought into contact with 3.7 litres/min. of hydrogen chloride gas and 5.6 litres/min. nitrogen blown into the furnace at reaction temperature 600° C. from below, in a counter current, to effect chlorination.

The conversion of hydrogen chloride in the chlorination was 90%. Subsequently, said reaction mass was introduced from above into the identical furnace as described above. The reaction mass was then allowed to flow down by gravity at a velocity of 2.8 kg./hour and brought into contact with 4.3 litres/min. of demoistured air blown into said furnace from below at the reaction temperature of 600° C., in a counter current, to effect oxidation.

From the top of the furnace, a mixed gas containing 20 volumes percent chlorine and 1.5 volume percent hydrogen chloride was obtained. The yield of the mixed gas was 90% to the hydrogen chloride fixed in the reaction mass by chlorination.

EXAMPLE 3

238 gm. of anhydrous magnesium chloride ($MgCl_2$), 93 gm. of potassium chloride and 150 gm. of cadmium chloride were melted at 600° C.

Thereafter, 100 gm. of the same Celite 408 (diatomaceous earth carrier) as used in Example 2 was put in the aforesaid prepared fused salts, taken out after 1 hour immersion, and pretreated as in Example 2, to produce reaction mass. The weight of effective components contained in the reaction mass after pretreatment was 50% of the total weight of reaction mass.

The reaction mass was introduced in a similar furnace as used in Example 2 from above. The reaction mass was then allowed to flow down by gravity at a velocity of 4.8 kg./hour and brought into contact with 2.2 litres/min. of hydrogen chloride and 3.3 litres/min. of nitrogen blown into the furnace from below at the reaction temperature of 600° C. in a counter current, to effect chlorination.

The conversion of hydrogen chloride in the chlorination was 80%.

Subsequently, the reaction mass was introduced from above into the same furnace as described above, and said mass was made to flow down by gravity at a velocity of 3.0 kg./hour, and brought into contact with 2.7 litres/min. of demoistured air blown into the furnace from below at the reaction temperature of 600° C. in a counter current, to effect oxidation.

From the top of furnace, a mixed gas containing 17 volume percent chlorine and 2.0 volume percent hydrogen chloride was obtained. It showed 91% yield to the hydrogen chloride fixed in the reaction mass by chlorination.

EXAMPLE 4

305 gm. of magnesium chloride ($MgCl_2 \cdot 6H_2O$), 87 gm. of sodium chloride and 31 gm. of anhydrous cupric chloride were completely dissolved in 350 cc. of water, to obtain an aqueous solution. 300 gm. of aforesaid Celite 408 was put in said solution and was allowed to stand for about 1 hour, after heating to boiling condition.

The resulting reaction mass was taken out from the aqueous solution, dried at 110° C. for 3 hours, and then chlorinated for 1 hour at the reaction temperature of 600° C. with a mixed gas of hydrogen chloride and nitrogen (partial pressure of hydrogen chloride was 0.4 atm.), and then was oxidized for 1 hour with air. These impregnation, chlorination and oxidation were repeated again.

The weight of effective components contained in thus obtained reaction mass was 22% to the total weight of reaction mass.

The reaction mass thus prepared was progressively chlorinated and oxidized under the same conditions as in Example 3, and conversion of hydrogen chloride in the chlorination was 75% and in the oxidation a gas consisting of 16 volume percent chlorine and 2 volume percent hydrogen chloride was obtained.

EXAMPLE 5

The same reaction mass as in Example 1 was prepared. The resulting reaction mass was dried for about 3 hours at 110° C., and then chlorinated in the furnace for 1 hour at 600° C. by using a mixed gas of hydrogen chloride and nitrogen (partial pressure of hydrogen chloride was 0.4 atm.), and thereafter oxidized for about 1 hour at 600° C. by using air.

These impregnation, chlorination and oxidation were repeated again.

The weight of effective components contained in the reaction mass thus obtained was 23% of the total weight of reaction mass.

The reaction mass thus prepared was introduced from above into the furnace (the retaining amount of reaction mass was 540 gm.) comprising a moving bed having 3 cm. inner diameter and 60 cm. high, and the reaction mass was allowed to flow down at a velocity of 540 gm./hour by gravity and was brought into contact with 31 cc./min. hydrogen gas and 31 cc. nitrogen gas which were blown into the furnace from below at the temperature of 600° C., in a counter current whereby reduction was effected.

Substantially all of the divalent copper contained in the reaction mass was converted into monovalent copper by reduction, and conversion of hydrogen was 94%.

The reduced reaction mass was introduced from above into a furnace having the same moving bed as used in the reduction and the reaction mass was allowed to flow down at a velocity of 540 gm./hour by gravity and brought into contact with a mixed gas of 210 cc./min. hydrogen chloride and 325 cc./min. nitrogen which was blown into the furnace from below at the reaction temperature of 600° C. in a counter current, whereby chlorination was effected.

Conversion of hydrogen chloride in the chlorination was 94%.

The reaction mass thus chlorinated was separately submitted to oxidation with air and oxidation with oxygen respectively, thereby chlorine gas is generated.

Oxidation with air:

Chlorinated reaction mass is introduced from above into a furnace having a similar moving bed to that used for carrying out the chlorination, and said reaction mass was allowed to flow down by gravity at a velocity of 540 gm./hour and brought into contact with 380 cc./min. of demoistured air blown from below the furnace at the reaction temperature of 600° C., in a counter current.

A mixed gas containing 21 volume percent chlorine and 1.5 volume percent hydrogen chloride was obtained from the top of furnace.

Chlorine and hydrogen chloride produced by oxidation was 93% to hydrogen chloride fixed in reaction mass by chlorination.

Oxidation with oxygen:

Chlorinated reaction mass was introduced from above into a similar furnace to that in which oxidation was effected by using air.

Then, said reaction mass was allowed to flow down at a velocity of 540 gm./hour by gravity and was brought into contact with 100 cc./min. of demoistured oxygen gas blown into a furnace from below at the reaction temperature of 600° C., in a counter current.

A mixed gas containing 74 volume percent chlorine and 2 volume percent hydrogen chloride was obtained from the upper part of the furnace.

Chlorine and hydrogen chloride produced by oxidation was 98% to hydrogen chloride fixed in the reaction mass by chlorination.

EXAMPLE 6

The same reaction mass as in Example 1 was prepared, and said reaction mass was then dried as in Example 1, and then was chlorinated in the same manner at 600° C. by using a mixed gas of hydrogen chloride with nitrogen, and oxidized in the same manner. These impregnation, chlorination and oxidation were repeated again. The weight of effective components contained in the reaction mass thus obtained was 23% to the total weight of reaction mass.

Reaction mass prepared in this manner was subjected to reduction in the same manner as in Example 5.

Substantially all of the divalent copper contained in the reaction mass was converted into monovalent copper and conversion of hydrogen was 96%.

Further, no HCl was found in the discharged gas.

The reduced reaction mass was chlorinated under the same condition as in Example 5. Conversion of hydrogen chloride in the chlorination was 93.5% and no oxidation of hydrogen chloride was found. The reaction mass thus chlorinated has been introduced from above in a furnace comprising a similar moving bed to that as hereinbefore described, and the reaction mass was made to flow down by gravity at a velocity of 1080 gm./hour and was brought into contact with 145 cc./min. of demoistured air blown into the furnace from below at the reaction temperature of 600° C., in a counter current, whereby pre-oxidation was effected. Further, the amount of air (145 cc./min.) used in that time is equivalent to the amount necessary for oxidizing copper contained in the reaction mass to divalent state.

In the gas discharged from the top of furnace, 0.5 volume percent oxygen and 0.3 volume percent chlorine produced by oxidation of magnesium were contained.

The pre-oxidized reaction mass was introduced from above into a similar furnace to that hereinbefore described, and the reaction mass was allowed to flow down by gravity at a velocity of 540 gm./hour and was brought into contact with 360 cc./min. of demoistured air blown at the reaction temperature of 600° C. into said furnace from below, in a counter current.

As a result thereof, from the top of furnace was obtained a mixed gas containing 23.3 volume percent chlorine and 0.5 volume percent hydrogen chloride.

The chlorine and hydrogen chloride produced by oxidation was 95% to hydrogen chloride fixed in the reaction mass by chlorination.

EXAMPLE 7

The reaction mass prepared in the same manner as in Example 6 was introduced from above into an identical furnace with that used in Example 6, and said reaction mass was made to flow down at a velocity of 540 gm./hour by gravity and reduction was conducted by bringing said mass into contact with 31 cc./min. of carbon monoxide gas and 31 cc./min. of nitrogen gas, blown into said furnace from below at the reaction temperature of 600° C., in a counter current.

Whole copper salt was being contained in the reduced reaction mass as monovalent copper.

The reduced reaction mass was introduced from above into an identical furnace with that hereinbefore described, and said mass was allowed to flow down by gravity at 540 gm./hour velocity and was brought into contact with a mixed gas composed of 263 cc./min. of ammonia gas and 263 cc./min. of hydrogen chloride (equal to a feeding quantity of 37.8 gm./hour of ammonium chloride) and 132 cc./min. of nitrogen, which was blown into the furnace from below at the reaction temperature of 600° C., in a counter current, thereby chlorination was carried out.

Conversion of ammonium chloride in chlorination was 93% to ammonium chloride introduced.

On the other hand, it has been found, judging from the recovered amount of ammonia that ammonia was not burnt at the time of chlorination.

Thus, the chlorinated reaction mass was introduced from above into the same furnace as described above, and said mass was caused to flow down at a velocity of 1080 gm./hour by gravity, and was brought into contact with 160 cc./min. of a mixed gas composed of 25 volume percent chlorine, 6 volume percent oxygen and 60 volume percent nitrogen, blown into said furnace from below at the reaction temperature of 600° C., in a counter current, and pre-oxidation was carried out.

In the gas discharged from the upper part of the furnace were contained 0.4 volume percent oxygen and 0.3 volume percent chlorine.

The reaction mass thus pre-oxidized was introduced from above into the same furnace as described above, and said mass was caused to flow down at a velocity of 300 gm./hour by gravity and was brought countercurrently into contact with 236 cc./min. of demoistured air blown into the furnace from below at the reaction temperature of 600° C.

Thus, from the upper part of the furnace, a mixed gas was obtained which contains 24 volume percent chlorine and 1.6 volume percent hydrogen chloride.

EXAMPLE 8

143 gm. of anhydrous magnesium chloride ($MgCl_2$), 41 gm. of cupric chloride ($CuCl_2 \cdot 2H_2O$) and 44 gm. of sodium chloride (NaCl) were perfectly dissolved to obtain an aqueous solution. 300 gm. of commercial alumina carriers of which balls having been adjusted to 3 mm. diameters were put in the aqueous solution, and subjected to the pretreatment as in Example 1, thereby reaction mass was obtained, and the weight of effective component contained in the reaction mass after the pretreatment was completed was 22% of the total weight of reaction mass.

The prepared reaction mass was successively subjected to reduction, chlorination, pre-oxidation and oxidation under the same conditions as in Example 6, and therefrom, conversion of hydrogen chloride in chlorination was 74%. Also, a gas composed of 18 volume percent chlorine and 0.4 volume percent hydrogen chloride was obtained in oxidation.

EXAMPLE 9

Reaction mass was prepared in the same manner as in Example 6. The reaction mass was introduced from above into a similar furnace to that used in Example 6. Then, said reaction mass was caused to flow down by gravity at a velocity of 540 gm./hour, and reduction and chlorination were carried out simultaneously by countercurrently bringing the said mass into contact with 31 cc./min. of hydrogen gas, 193 cc./min. of hydrogen chloride gas and 330 cc./min. of nitrogen gas, blown into said furnace from below at the reaction temperature of 600° C.

Substantially the whole divalent copper contained in the reaction mass was converted into monovalent copper by reduction.

On the other hand, conversion of hydrogen was 80%, and conversion of hydrogen chloride was 93%.

The reaction mass thus treated was introduced from above into the similar furnace to that hereinbefore described. Then, said mass was flown down by gravity at a velocity of 3240 gm./hour, and brought into contact with 415 cc./min. of mixed gas composed of 25 volume percent of chlorine, 6 volume percent of oxygen and 69 volume percent of nitrogen, blown into the furnace from above at the reaction temperature of 600° C., in a counter current and pre-oxidation was effected.

In the gas discharged from the upper part of the furnace were contained 0.3 volume percent oxygen and 0.3 volume percent chlorine.

The pre-oxidized reaction mass was introduced from above into an identical furnace with that hereinbefore described. Thus, said reaction mass was flown down at a velocity of 540 gm./hour by gravity and brought into contact with 360 cc./min. of demoistured air blown into the furnace from below at the reaction temperature of 600° C., in a counter current.

From the upper part of the furnace, a gas containing 24 volume percent chlorine and 1.1 volume percent hydrogen chloride was obtained.

What we claim is:

1. A process for the production of chlorine from a chloride which comprises the steps of:
    (A) chlorinating a reaction mass without substantial formation of basic magnesium chloride by contacting a reaction mass in a reaction zone with vapors of a reactant gas at a temperature of from 500 to 650° C., said reactant gas being selected from the group consisting of hydrogen chloride and ammonium chloride, said reaction mass comprising a porous inert support impregnated with (a) a magnesium compound selected from the group consisting of magnesium chloride and magnesium oxide, (b) an alkali metal chloride, and (c) at least one reaction promoter selected from the group consisting of chlorides of copper, cadmium and nickel, wherein the mole ratio of said alkali metal chloride to the magnesium compound is from 0.3 to 1.5 and the atomic ratio of copper to magnesium is in the range of 0.05 to 0.5;
    (B) generating chlorine from the reaction mass by contacting said chlorinated reaction mass with an oxygen-containing gas at a temperature of from 500 to 650° C. to generate chlorine by oxidation of the reaction mass; and
    (C) recycling the oxidized reaction mass to chlorination step (A), above.

2. A process according to claim 1 wherein said reaction promoter is copper chloride, and wherein the process includes the further step of contacting the reaction mass prior to the chlorination step with a reducing gas selected from the group consisting of hydrogen, carbon monoxide, water gas and coal gas to reduce copper to a monovalent state.

3. A process according to claim 2 including the further step of, prior to the oxidation step, contacting the chlorinated reaction mass with an oxidizing gas selected from the group consisting of chlorine and an oxygen-containing gas, to oxidize the copper to a divalent state.

4. A process according to claim 1 wherein said reaction promoter comprises copper chloride and wherein said process includes the further step of introducing a reducing gas selected from the group consisting of hydrogen, carbon monoxide, water gas and coal gas into said reaction zone simultaneously with said reactant gas to reduce copper to the monovalent state.

References Cited

UNITED STATES PATENTS

| | | | |
|---|---|---|---|
| 2,524,566 | 10/1950 | Houtman et al. | 252—475 |
| 3,432,573 | 3/1969 | Keil | 252—457 |
| 2,577,808 | 12/1951 | Pye et al. | 23—219 |
| 3,323,871 | 6/1967 | Fukuzawa et al. | 23—219 |
| 3,383,177 | 5/1968 | Metaizeau | 23—219 |
| 3,384,456 | 5/1968 | Metaizeau | 23—219 |

FOREIGN PATENTS

| | | | |
|---|---|---|---|
| 1,359,594 | 3/1964 | France | 23—219 |

OSCAR R. VERTIZ, Primary Examiner

G. O. PETERS, Assistant Examiner